E. C. EATON.
GANG-PLOWS.
No. 174,416.   Patented March 7, 1876.
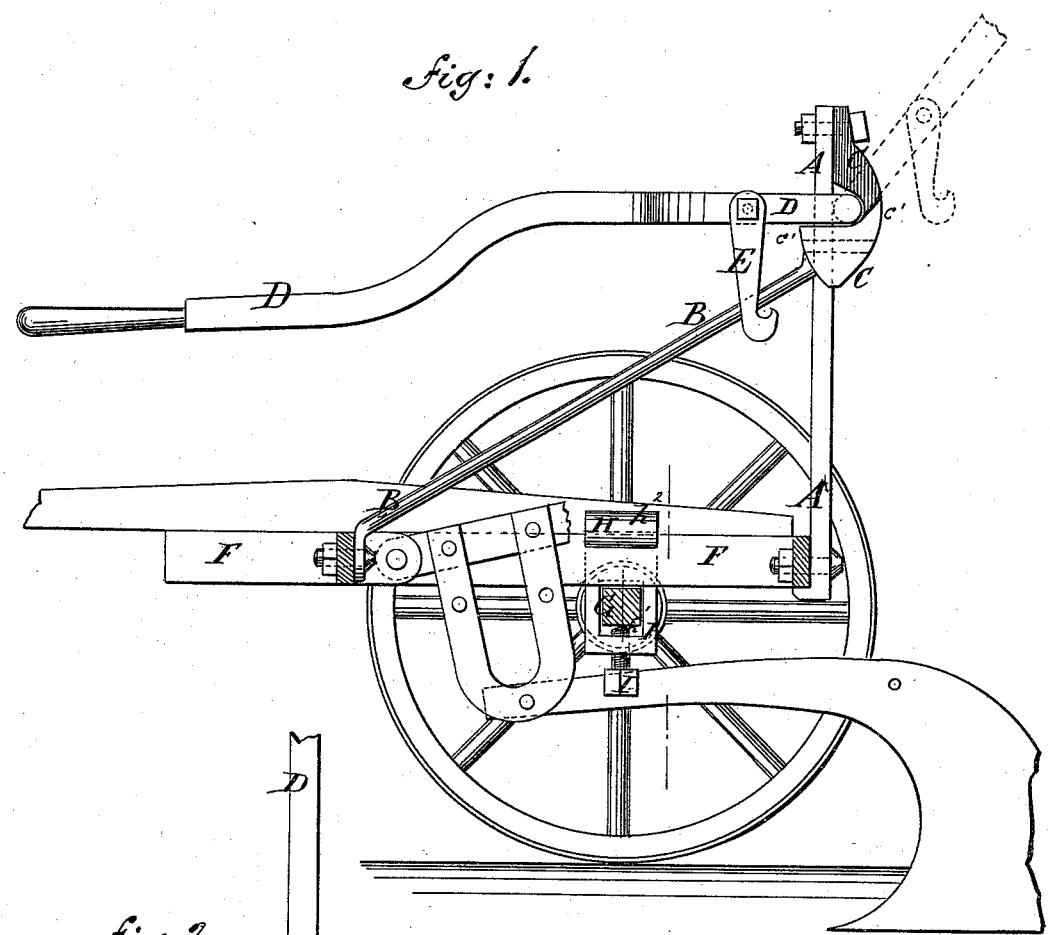
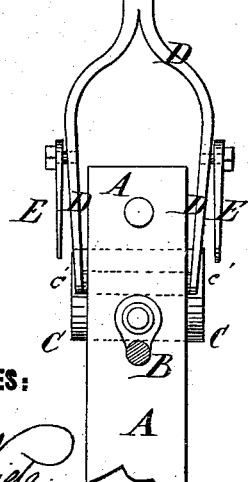
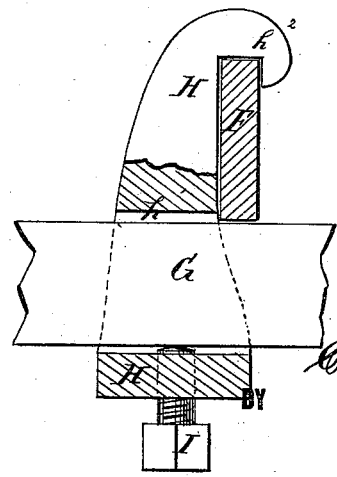
WITNESSES:
INVENTOR:
ATTORNEYS.

UNITED STATES PATENT OFFICE.

ENOCH C. EATON, OF PINCKNEYVILLE, ILLINOIS.

IMPROVEMENT IN GANG-PLOWS.

Specification forming part of Letters Patent No. 174,416, dated March 7, 1876; application filed February 14, 1876.

*To all whom it may concern:*

Be it known that I, ENOCH C. EATON, of Pinckneyville, in the county of Perry and State of Illinois, have invented a new and useful Improvement in Gang-Plows, of which the following is a specification:

Figure 1 is a side view of my improved device, shown as applied to a gang-plow frame. Fig. 2 is a detail view of the device for raising the plows. Fig. 3 is a detail view of the device for adjusting the plows, part being broken away to show the construction.

Similar letters of reference indicate corresponding parts.

The object of this invention is to improve the construction of the gang-plow for which Letters Patent No. 172,403 were granted to me January 18, 1876, to enable the plows to be more readily raised, and to enable the plows to be conveniently moved toward or from the land, as may be required.

The invention consists in the combination of the post, the brace, the bearing-block, provided with the double shoulders or stops, and the lever provided with the pivoted hooks, to adapt the device for attachment to the frame of a gang-plow for raising the plows, and in the combination of the block, provided with the slot and the hook, and the clamping-screw, with the axle and the frame of a gang-plow, as hereinafter fully described.

A is a post, which is made with a flange upon its lower end, and a bolt-hole through it, to adapt it to be bolted to a cross-bar of the frame above and between the plows. The post A is strengthened in position by a brace, B, the upper end of which is bolted to the upper end of the said post, and its lower end is bolted to the frame. To the upper end of the post A is attached a block, C, to serve as a bearing for the forked end of the lever D. Upon the opposite sides of the block C are formed double lugs, shoulders, or stops C', to receive and support the forks of the lever D, both when the plows are in working position and when they are raised from the ground. To the opposite sides of the lever D, at a little distance from its pivot, are pivoted hooks E, to receive chains attached to the plows. The lever D projects into such a position that it may be readily reached and operated by the driver from his seat to raise and lower the plows. F represents a side bar of the frame, the lower side of which rests upon the axle G. H is a block, in the lower part of which is formed a slot, $b'$, to receive the axle G, and upon its upper end is formed a hook, $h^2$, to hook over the upper side of the side bar F. In the lower end of the block H is formed a screw-hole to receive the screw I, the forward end of which rests against the lower side of the axle G, so that by turning the said screw in, the side bar F may be drawn down upon and clamped securely to the axle G.

By this construction, by loosening the screw I the frame may be slid laterally upon the axle to move the plows toward or from the land, or may be slid forward or back to adjust the plows longitudinally.

Having thus described my invention, I claim as new and desire to secure by Letters Patent—

1. The combination of the post A, brace B, bearing-block C, provided with the double shoulders or stops C', and the lever D, provided with the hooks E, to adapt the device for attachment to the frame of a gang-plow for raising the plows, substantially as herein shown and described.

2. The combination of the block H, provided with the slot $h^1$ and hook $h^2$, and the clamping-screw I, with the axle G and the frame F of a gang-plow, substantially as herein shown and described.

ENOCH C. EATON.

Witnesses:
 JOHN B. EATON,
 E. F. CAMPBELL.